Dec. 7, 1937. R. R. D. MILLIGAN 2,101,622
TRAILER HITCH COUPLING
Filed March 4, 1937
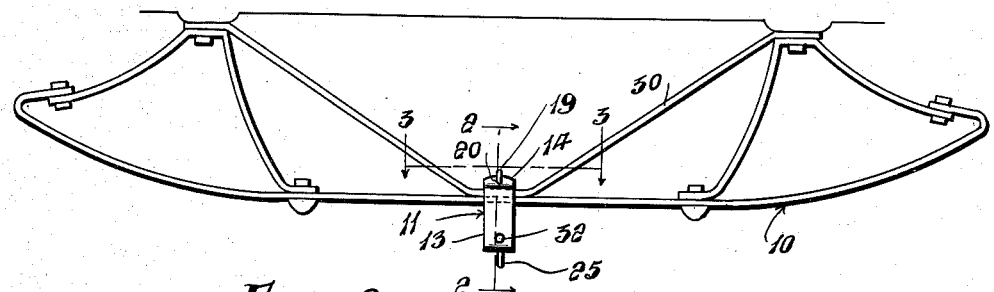
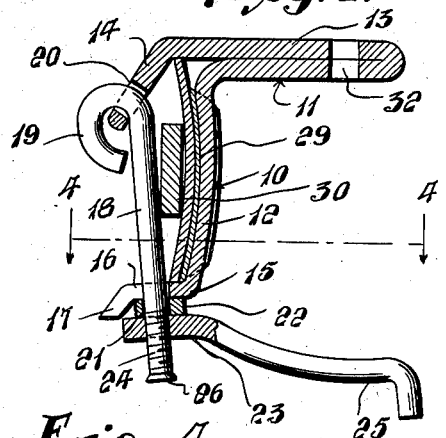
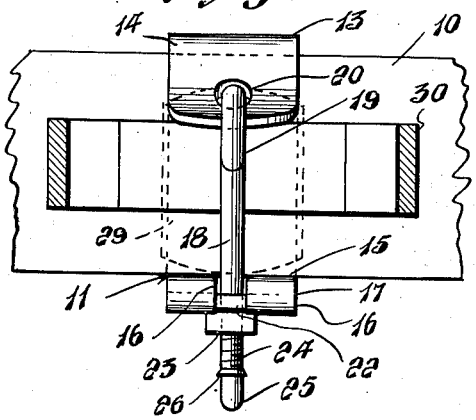
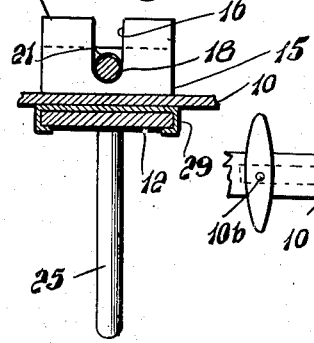
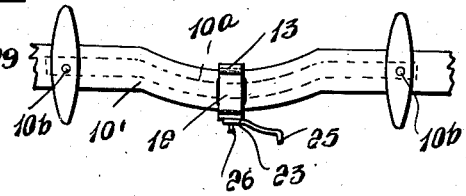
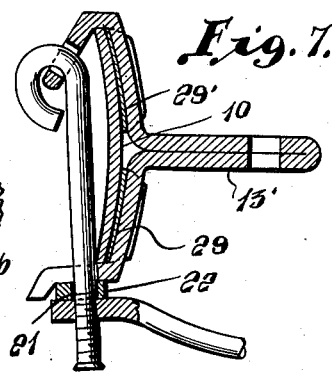
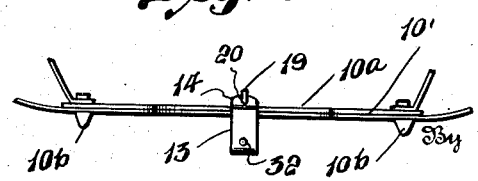
Inventor
R. R. D. Milligan
By L. F. Randolph
Attorney Patented Dec. 7, 1937

2,101,622

UNITED STATES PATENT OFFICE 2,101,622

TRAILER HITCH COUPLING

Robert R. D. Milligan, Portland, Ind.

Application March 4, 1937, Serial No. 129,036

3 Claims. (Cl. 280—33.15)

This invention relates to a trailer hitch coupling, bracket or connection which is adapted to be easily applied to or removed from the rear bumper or the equivalent, as of an automobile, to enable a trailer or the like to be efficiently connected to a draft vehicle.

It is aimed to provide a novel construction which may be readily applied without the use of tools and without the necessity of separating parts which are apt to become lost.

An important feature is to provide a construction wherein the pull or draft comes directly on the body or main portion of the device rather on the eyebolt or other fastening means.

The more specific objects and advantages will become apparent from a consideration of the description following taken in connection with accompanying drawing illustrating an operative embodiment.

In said drawing:—

Figure 1 is a plan view of a rear bumper of an automobile having the invention applied thereto;

Figure 2 is a vertical sectional view taken on the line 2—2 of Figure 1;

Figure 3 is a sectional view taken on the line 3—3 of Figure 1;

Figure 4 is a detail section taken on the line 4—4 of Figure 2;

Figure 5 is an elevation showing the coupling applied to a different type of bumper;

Figure 6 is a plan view of parts of Figure 5, and

Figure 7 is a vertical sectional view through a modified form of coupling.

Referring specifically to the drawing wherein like reference characters designate like or similar parts, 10 designates a conventional form of rear bumper as used on an automobile. In accordance with the invention, a coupling is provided at 11, preferably bent into shape from a broad strap of metal, the same having an intermediate upstanding portion 12, preferably slightly arcuate, a portion 13 doubled upon itself and horizontally disposed, the free end of which provides a downwardly and forwardly inclined hook lug 14 at its terminal. The other terminal of the strap as at the lower end or portion 12 is in the form of a jaw 15, bifurcated as at 16 and having downwardly extending flanges 17 on opposite sides thereof.

A fastening bolt 18 is employed having an eye 19 loosely or pivotally connected with an opening or eye 20 of the hook lug 14. Said bolt is disposable in the bifurcation 16 and it passes loosely through an opening 21 in a plate or bar 22 which is engageable behind the flanges 17. Beneath the bar 22 a nut 23 is screw threaded at 24 onto the bolt 18 and the nut has an elongated handle 25 to facilitate operation thereof and dispense with the use of separate tools. In order to prevent detachment of the nut 23 from the bolt 18, the latter at its lower end is preferably enlarged or flanged as at 26.

The invention is applied to the bumper 10 so that the main bar of such bumper is received between the portion 12, lug 14, jaw 15 and bolt 18, a lead or other protective sheet preferably being employed as at 29, to engage the face of the bumper and prevent marring or injuring thereof.

I also preferably provide a reenforcement for the bumper consisting of the bar or strap 30, for example, and this is also accommodated, as will be seen in Figure 2, between the bumper 10, bolt 18, lug 14 and jaw 15.

It will be realized that the strap from which the device is primarily made is somewhat resilient so that the jaw 15 and lug 14 may tightly engage the edges of the bar 10.

In Figures 5 and 6, my invention is shown applied to a bumper which is reenforced differently from that of Figure 1. In this form, the bumper is generally designated 10' and the reenforcement consists of a bar 10ᵃ disposed against the front thereof and held in place by the means 10ᵇ, which connects the bumper to the automobile. This form of the invention corresponds to that disclosed in Figures 1 to 4.

It will be realized that the trailer is hitched or connected by any suitable means at the portion 13, by connection with an opening 32 therethrough.

Various changes may be resorted to provided they fall within the spirit and scope of the invention. For example, the form of Figure 7 may be employed and it differs from the preceding form of the invention only in having the returned portion designated 13', which is the equivalent of that at 13 in the other form, arranged at a distance below the upper end of the device rather than at the upper end and by employing a lead or other element 29' of slightly different shape, functioning like that at 29.

In Figure 7 is also illustrated a further modification of the use of the invention and it will be apparent that this modified use is also applicable to the preferred form of the other figures. It will be noted that the opening 21 is off center relatively to the side edges of the plate or bar 22 so that by reversing the position of said bar from that shown in Figure 2, to that shown in Figure 7 the parts are assembled on the bumper 10 without necessity of using the reenforcement bar or strap 30.

I claim as my invention:—

1. A coupling device of the class described for engagement with a bumper or the like, the device comprising one sheet of metal having an intermediate portion, a jaw extending from said intermediate portion, a portion extending from the intermediate portion in the opposite direction to the jaw and returned past the intermediate portion and terminating in a hook lug, the returned portion and part of the second mentioned portion beneath it having an aperture therethrough for the reception of a trailer drawbar, a bolt pivoted to the hook lug, and fastening means on the bolt for clamping engagement with the jaw.

2. A coupling device of the class described for engagement with a bumper or the like, the device comprising one sheet of metal having an intermediate portion, a jaw extending from said intermediate portion, a portion extending from the intermediate portion in the opposite direction to the jaw and returned past the intermediate portion and terminating in a hook lug, the returned portion and part of the second mentioned portion beneath it having an aperture therethrough for the reception of a trailer drawbar, a bolt pivoted to the hook lug, fastening means on the bolt for clamping engagement with the jaw, said hook lug inclining downwardly toward the jaw, said jaw being bifurcated and having downwardly extending flanges, a bar beneath the jaw and behind the flanges through which the bolt passes, and a nut threaded on the bolt and engageable with the bar.

3. A coupling device of the class described for engagement with a bumper or the like, the device having an intermediate portion, a jaw extending from said intermediate portion, a portion extending from the intermediate portion in the opposite direction to the jaw and returned past the intermediate portion and terminating in a hook lug, a bolt pivoted to the hook lug, fastening means on the bolt for clamping engagement with the jaw, said hook lug inclining downwardly toward the jaw, said jaw being bifurcated and having downwardly extending flanges, a bar beneath the jaw and behind the flanges through which the bolt passes, a nut threaded on the bolt and engageable with the bar, said nut being elongated whereby it may be turned without the aid of a tool, and said returned portion having an opening therethrough to enable the hitching of a trailer thereto.

ROBERT R. D. MILLIGAN.